J. C. McLAUGHLIN.
Damper Regulator.
No. 232,359. Patented Sept. 21, 1880.
Fig.1.
Fig.2.
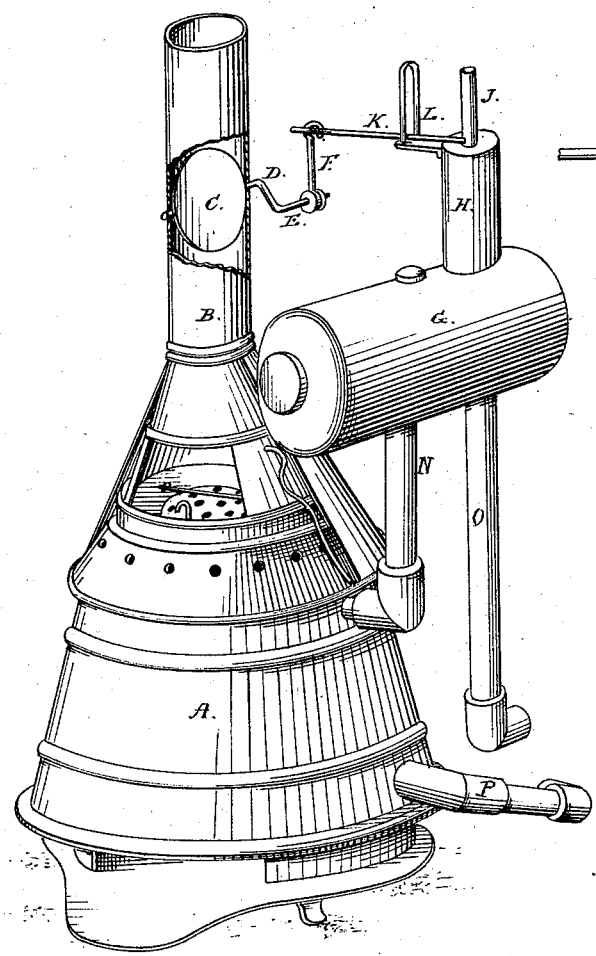
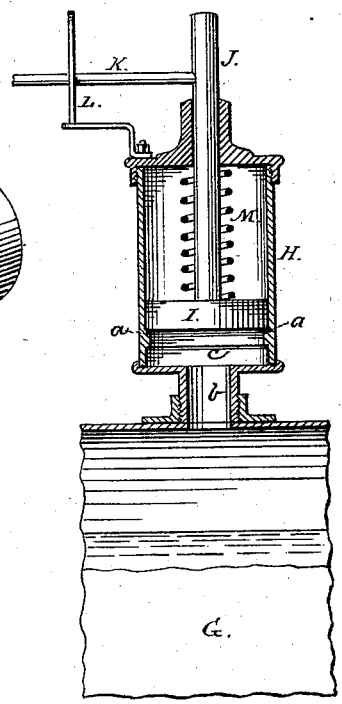
Attest:
F. W. Howard
J. A. Payne.
Inventor:
John C. McLaughlin
by Geo. W. Dyer
Atty.

UNITED STATES PATENT OFFICE.

JOHN C. McLAUGHLIN, OF DETROIT, MICHIGAN, ASSIGNOR OF ONE-HALF OF HIS RIGHT TO THOMAS A. BISSELL, OF SAME PLACE.

DAMPER-REGULATOR.

SPECIFICATION forming part of Letters Patent No. 232,359, dated September 21, 1880.

Application filed January 30, 1879.

*To all whom it may concern:*

Be it known that I, JOHN C. MCLAUGHLIN, of the city of Detroit, in the county of Wayne and State of Michigan, have invented an Improvement in Damper-Regulators for Circulating Water-Heaters, of which the following is a specification.

The nature of my invention relates to certain new and useful improvements in devices attached to heating devices, designed for heating purposes by circulating hot water through pipes in the apartment or car to be heated, wherein such circulation is produced by a cushion of steam in a vessel connected with such heater and said pipes. In such devices the boiler or heater and its connecting-pipes are filled with water, and the vessel referred to is situated at some little distance above the boiler and entirely detached therefrom, except that the two are connected together by a water pipe or pipes. This vessel, from which the radiating pipes receive their heated water, is partially filled with water, leaving a part of its area as a steam-space.

The object of my invention is to utilize the varying pressure of steam in this vessel to control a damper in the smoke stack or pipe of the heater, so that a more uniform fire will be maintained therein and danger of explosion will be obviated.

My invention therefore consists in combining with such a heater, provided with a suitable vessel to inclose a steam-cushion to force the water to circulate through its connecting-pipes, a peculiar device for regulating automatically the fire in said heater, as more fully hereinafter described.

In the drawings, Figure 1 shows a perspective view of a Baker heater with my improvement attached and a part of the flue broken out to show the damper. Fig. 2 represents a vertical section through the cylinder of the regulator and the chamber G.

In the accompanying drawings, which form a part of this specification, A represents a heater of the description named, provided with a smoke-pipe, B, in which is placed the damper C, supported upon a shaft suitably journaled in the pipe. This shaft D terminates in a crank-arm, E, to which is pivoted the connecting-rod F.

G is a vessel connected with said heater by a pipe or pipes, N, but otherwise entirely detached therefrom. Into the upper part of this vessel G there is screwed a short cylindrical tube, $b$, open at both ends, and forming a part of a cylinder, H, the upper end of which is closed, while the lower end opens into the steam-space in said vessel. Within this cylinder is a piston-head, I, attached to the lower end of the piston-rod J, which projects through the closed head of the cylinder.

Secured to and projecting from the piston-rod J is the rigid arm K, which, near midway of its length, passes through a guide, L, secured to the side of the cylinder, or to any other convenient point. To the outer end of this arm is pivoted the upper end of the connecting-rod F, the whole so arranged that an excess of fire in the heater will cause a greater compression of steam in the vessel, which pressure will force the piston upward, when the like movement of the piston-rod will, by its connections, compel the damper in the pipe to close, thereby checking the draft. As the pressure is diminished by checking the fire, the weight of the piston will cause it to descend, thereby opening the damper. These devices are made adjustable, so that just the pressure to give the desired force and rapidity of the circulation will be automatically maintained.

M is a spring interposed between the cylinder-head and piston to assist in forcing down the piston-head against the pressure of the steam.

The cylinder H is provided, near its lower end, with a circular flange or projection, $a$, on which rests the outer edge of the piston-head I when down. This flange or rest $a$ for the piston-head limits its downward movement, and leaves a steam-space, $c$, of the same diameter as the cylinder, into which the steam passes from the vessel G through the pipe $b$. By this construction the steam-pressure on the lower face of the piston-head acts on its entire lower face, save the portion resting on the flange, when the latter is down on its rest, and raises the same with less steam-pressure than when the latter is exerted on the small central area of the piston-head over the top of the tube $b$ when the piston-head, as ordinarily constructed, descends to the bottom of the cylinder. The formation of the rest $a$ in the cylinder therefore causes the movements of the piston-head upward to be made when less steam-pressure is exerted on the lower face of the head than in the construction in which no rest is employed, and the head in its down-stroke rests on the lower head of the cylinder. When the piston is down on its rest the damper is open.

O is a pipe leading and conveying the water from the vessel G to the heating-pipes located at or near the bottom of a railway-car, and P is the return-pipe, conveying the water from the pipes to the heater. By this construction a circulation of the hot water is effected, and the cooled water from the pipes returned to the heater at its lower end.

I am aware that a damper and draft-regulator for boilers and furnaces having a chamber connected by a single tube with the boiler and surmounted by a cylinder having a piston and piston-rod, to the upper end of which is pivoted a lever carrying on its arms adjustable weights, and fulcrumed in an arm secured to the chamber and connected with rods secured to a damper at one end, and a draft-regulator at its opposite end, whereby the damper and draft-regulator are partially or entirely closed or opened by the pressure of air on the bottom of the piston as the heat applied to the boiler increases or decreases, as shown in Letters Patent granted to T. A. Lakin, dated November 19, 1878, No. 209,972, has heretofore been employed, and I therefore lay no claim to such construction, my invention being confined to the details of construction claimed, whereby I dispense with the pivoted lever, adjustable weights, and fulcrum arm of the invention disclaimed, and render my damper-regulator more sensitive in its operation and simpler and more compact in its construction, whereby I am enabled to apply the device to a Baker car-heater where the space in the car for the application of a damper-regulator device is limited in extent, and a weighted lever would be objectionable and inoperative on account of the oscillation of the car while in motion.

What I claim as my invention, and desire to secure by Letters Patent, is—

The combination, with the heater A, having the pipe B, and the vessel G, connected with the heater by the pipe N, and with the coil by the pipe O, said coil having the return-pipe P, leading to the lower part of the heater, of the cylinder H, having the open tube $b$, leading into the steam-space of the vessel G, and provided with the flanged rest $a$, piston I, spring M, piston-rod J, carrying the rigid arm K, slotted guide L, hooked arm F, and damper C, having crank-arm E, the whole constructed, arranged, and operated in the manner and for the purpose set forth.

JOHN C. McLAUGHLIN.

Witnesses:
H. S. SPRAGUE,
CHAS. J. HUNT.